(12) United States Patent
Van Houtte

(10) Patent No.: US 6,302,589 B1
(45) Date of Patent: Oct. 16, 2001

(54) STEERING BEARING ASSEMBLY FOR WHEELED VEHICLE

(76) Inventor: Philippe Van Houtte, 35 Sq. de la Garenne, 95500 Gonesse (FR)

( * ) Notice: Subject to any disclaimer, the term of this patent is extended or adjusted under 35 U.S.C. 154(b) by 0 days.

(21) Appl. No.: 09/470,572

(22) Filed: Dec. 22, 1999

(51) Int. Cl.$^7$ .................................................. B62K 21/06
(52) U.S. Cl. ............................ 384/545; 384/452; 280/279
(58) Field of Search .................................. 384/452, 545; 74/551.1; 280/279

(56) References Cited

U.S. PATENT DOCUMENTS

| | | | |
|---|---|---|---|
| 420,805 | * | 2/1890 | Keating ............................ 280/279 X |
| 4,068,858 | | 1/1978 | Harrison et al. ..................... 280/289 |
| 4,341,394 | | 7/1982 | Cabeza ................................ 280/279 |
| 5,095,770 | | 3/1992 | Rader, III ........................... 74/551.1 |
| 5,272,936 | * | 12/1993 | Nagano .............................. 74/551.1 |
| 5,405,202 | * | 4/1995 | Chi ....................................... 384/545 |
| 5,681,119 | * | 10/1997 | Marui .................................. 384/545 |

FOREIGN PATENT DOCUMENTS 5-32188 (A) * 2/1993 (JP) ..................................... 280/279

* cited by examiner

*Primary Examiner*—Richard M. Lorence
(74) *Attorney, Agent, or Firm*—Charles E. Baxley

(57) ABSTRACT

A steering bearing device includes a bearing disposed between an upper portion of a head tube and a steerer tube. The steerer tube includes a race disposed on the lower portion. Two bearings are disposed between the lower portion of the head tube and the race and disposed one above the other. The lower bearing is for anti-thrust purposes and for absorbing shocks from the steerer tube. The race includes an annular chamber formed between an outer wall and an inner fence for receiving the lower bearing and for forming an excellent seam for preventing water from entering into the bearing device.

10 Claims, 2 Drawing Sheets

STEERING BEARING ASSEMBLY FOR WHEELED VEHICLE

BACKGROUND OF THE INVENTION

1. Field of the Invention

The present invention relates to a bearing, and more particularly to a steering bearing assembly for wheeled vehicle.

2. Description of the Prior Art

U.S. Pat. No. 4,068,858 to Harrison et al., and U.S. Pat. No. 4,341,394 to Cabeza, and U.S. Pat. No. 5,095,770 to Rader, III, disclose the typical steering bearings for rotatably securing the handlebars to the forks of the cycles. The typical steering bearings each includes a ball bearing provided between the bottom of the head tube and the fork member and/or the steerer tube. The ball bearing may not resist thrust and shocks and vibrations transmitted from the fork member and/or the steerer tube to the head tube and may be easily broken after use. In addition, a gap or a peripheral groove is formed in the ball bearing and/or formed between the fork member and/or the steerer tube and the head tube such that dirt or contaminant or liquid, particularly the rain or the water may enter into the ball bearing and may rust and damage the ball bearing.

The present invention has arisen to mitigate and/or obviate the afore-described disadvantages of the conventional steering bearings.

SUMMARY OF THE INVENTION

The primary objective of the present invention is to provide a steering bearing assembly for wheeled vehicle including a bearing for anti-thrust purposes, and including a structure for preventing water or contaminant from entering into the bearing assembly.

In accordance with one aspect of the invention, there is provided a steering bearing assembly comprising a head tube including an upper portion and a lower portion, a steerer tube rotatably received in the head tube and including a race provided thereon, and a first bearing disposed between the upper portion of the head tube and the steerer tube. a second bearing provided between the lower portion of the head tube and the race. The steering bearing assembly further includes a second bearing and a third bearing disposed between the lower portion of the head tube and the race for anti-thrust purposes and for absorbing shocks and vibrations from the steerer tube.

The race includes an annular chamber formed therein for receiving the third bearing, and includes an inner peripheral portion having a peripheral fence extended upward therefrom and includes an outer peripheral portion having a peripheral wall extended upward therefrom for defining the annular chamber between the peripheral fence and the peripheral wall. The peripheral wall includes a height greater than that of the peripheral fence.

The third bearing is preferably a roller bearing. A first washer is disposed between the third bearing and the race and a second washer is disposed between the third bearing and the second bearing.

A cup includes a peripheral board engaged on the third bearing and includes an annular shoulder formed therein for receiving the second bearing. A cover is further engaged on the second bearing and includes an inner peripheral portion engaged between the head tube and the cup and including an outer peripheral portion.

The race includes an upper annular shoulder formed in the outer peripheral wall thereof. The cover includes an outer peripheral and annular protrusion extended downward therefrom and engaged into the annular shoulder of the race for preventing water or dirt from entering into the bearing assembly.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figures 1, 3:
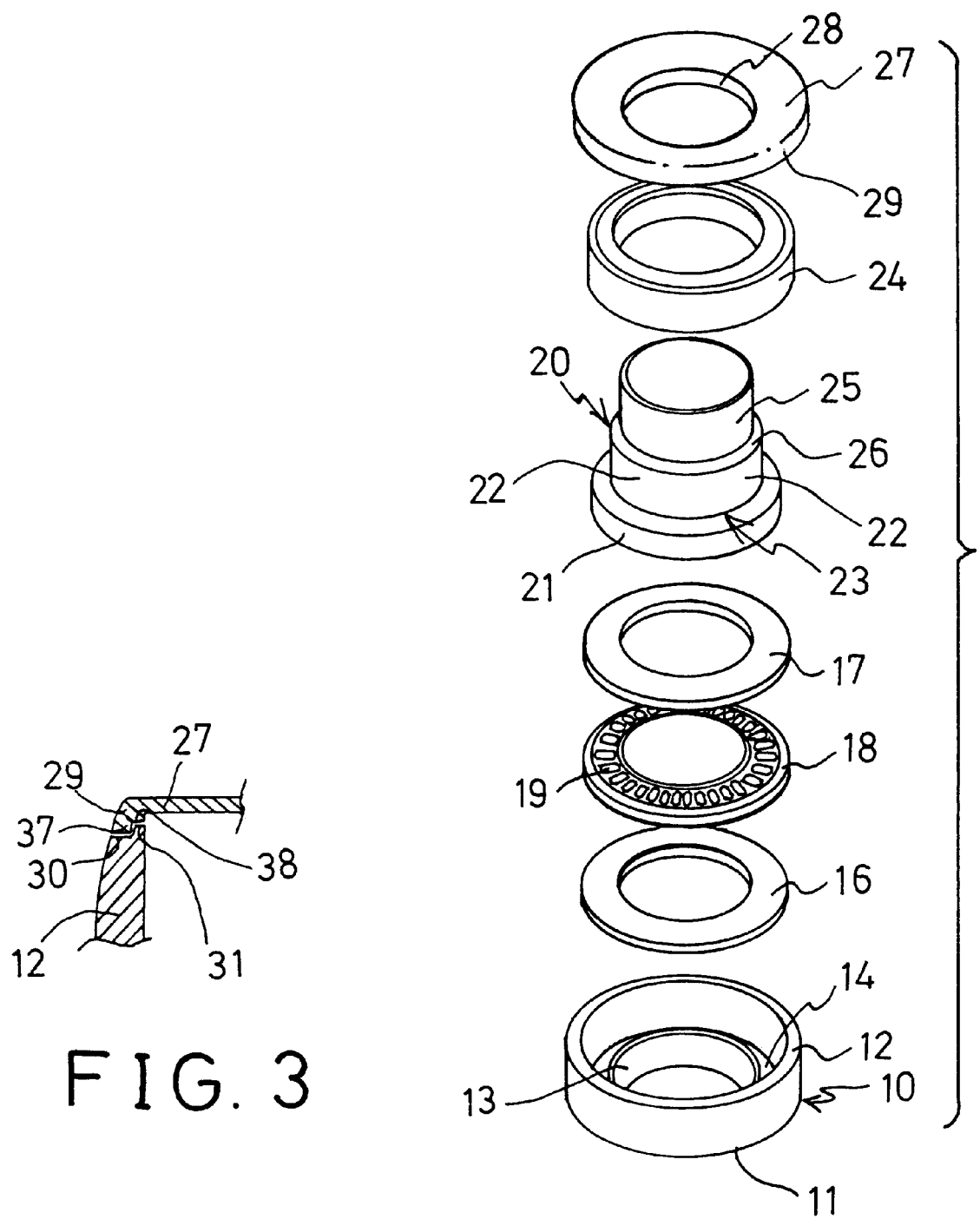
FIG. 1 is a partial exploded view of a steering bearing assembly in accordance with the present invention.
FIG. 3 is an enlarged partial cross sectional view of the steering bearing assembly.
Figure 4:
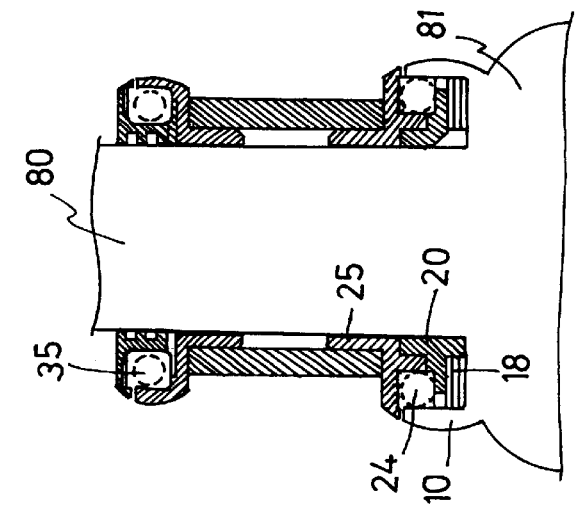
FIGS. 4 and 5 are cross sectional views similar to FIG. 2, illustrating two application of the steering bearing assembly.
Figure 5:
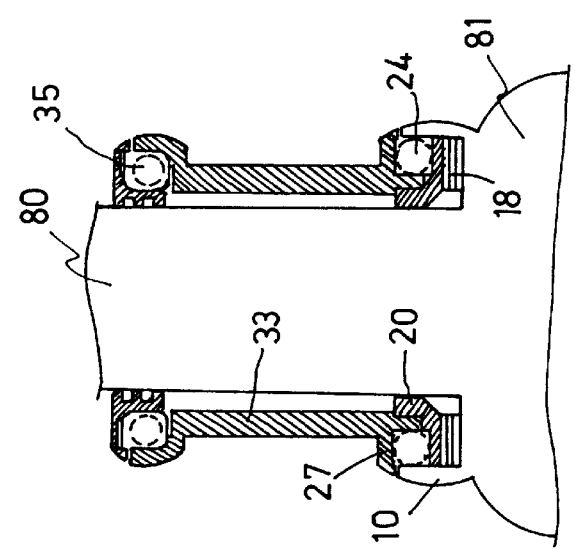
Figure 2:
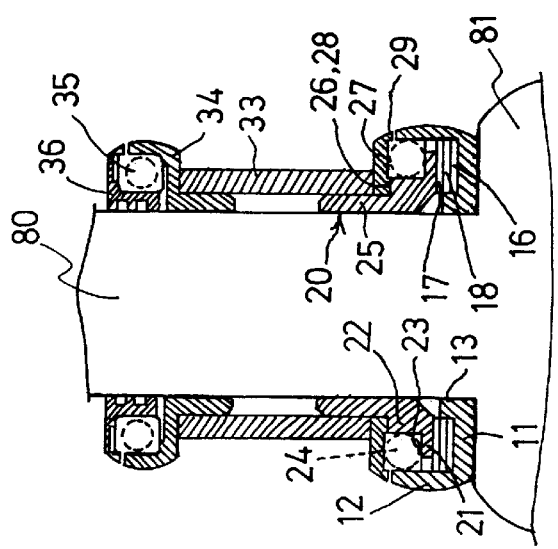
FIG. 2 is a cross sectional view of the steering bearing assembly.

Referring to the drawings, and initially to FIGS. 1 and 2, a steering bearing assembly in accordance with the present invention comprises an inverted crown race 10 press fitted on a fork crown 81 and/or a steerer tube 80 and including an annular plate 11, an annular wall 12 and an annular fence 13 extended upward from the outer and the inner peripheral portion of the annular plate 11 for defining an annular chamber 14 therein. The annular wall 12 preferably includes a height greater than that of the annular fence 13. Alternatively, the race 10 may be formed integral with steerer tube and/or with the fork crown as shown in FIGS. 4 and 5. Two washers 16, 17 are received in the annular chamber 14 and one disposed above the other, and a bearing, particularly a thrust bearing 18, is disposed between the washers 16, 17. The bearing 18 may be needle, roller, ball, composite or the other materials, but preferably be the roller or needle bearing having a number of needles 19 horizontally provided therein.

A cup 20 includes a bottom board 21 engaged on the washer 17 and the bearing 18 and includes a barrel 22 extended upward from the inner peripheral portion of the board 21 for defining an annular shoulder 23 and for supporting a bearing 24 in therein. The bearing 24 may also be needle, roller, ball, composite or the other materials. The cup 20 further includes a sleeve 25 extended upward from the inner peripheral portion of the barrel 22 and engaged into the bottom portion of a head tube 33 for defining an annular shoulder 26 therein. A cover 27 is engaged on the bearing 24 and includes an annular rib 28 engaged in the annular shoulder 26 of the cup 20 and engaged between the cup 20 and the head tube 33. The cover 27 includes a peripheral skirt 29 extended downward from the outer peripheral portion thereof.

It is to be noted the bearing 18 may also be disposed above the other bearing 24 instead of being disposed below the bearing 24. Alternatively, the sleeve 25 may be extended upward from the cover 27 (FIG. 4) instead of being extended from the cup 20. Further alternatively, the cover 27 may be formed integral with the head tube 33 (FIG. 5) and may be formed by such as the composite fibers.

As best shown in FIG. 3, it is preferable that the annular wall 12 of the race 10 includes an annular projection 31 extended upward therefrom for defining an inner or outer peripheral shoulder 30. The peripheral skirt 29 of the cover 27 preferably includes an annular protrusion 37 engaged into the peripheral shoulder 31 of the annular wall 12 and includes an annular shoulder 38 formed therein for receiving the peripheral projection 31 of the annular wall 12 and for preventing water or dirt from entering into the bearing assembly. The inverted crown race 10 includes the annular wall 12 and the annular fence 13 extended upward from the outer and the inner peripheral portion of the annular plate 11 such that the crown race 10 has no gaps formed in the outer peripheral portion thereof and such that the water and dirt may be prevented from entering into the bearing assembly.

Another cup 34 is press fitted onto the upper portion of the head tube 33 for supporting a bearing 35, which may also be needle, roller, ball, composite or the other materials. A cap 36 is engaged between the steerer tube 80 and the bearing 35. The cup 34 and the bearing 35 and the cap 36 for rotatably coupling the upper portion of the steerer tube and the head tube are typical and are not related to the present invention and will not be described in further details.

In operation, as shown in FIG. 2, the thrust bearing 18 may be used to resist or to absorb the shocks or vibrations that may be transmitted to the bearing 24 and/or the cup 20. The bearing 24 may be solidly supported in the annular shoulder 23 of the cup 20 such that the cup 20 has no stress concentration problem. In addition, the bearing assembly includes an excellent seam for preventing water or dirt from entering into the bearing assembly.

Accordingly, the steering bearing assembly in accordance with the present invention includes a bearing for anti-thrust purposes, and includes a structure for preventing water or contaminant from entering into the bearing assembly.

Although this invention has been described with a certain degree of particularity. it is to be understood that the present disclosure has been made by way of example only and that numerous changes in the detailed construction and the combination and arrangement of parts may be resorted to without departing from the spirit and scope of the invention as hereinafter claimed.

I claim:

1. A steering bearing assembly comprising:
   a head tube including an upper portion and a lower portion,
   a steerer tube rotatably received in said head tube and including a race provided thereon,
   a first bearing disposed between said upper portion of said head tube and said steerer tube,
   a second bearing and a third bearing disposed between said lower portion of said head tube and said race, said third bearing being a thrust bearing for absorbing shocks transmitted to said steering bearing assembly.

2. The steering bearing assembly according to claim 1, wherein said race includes an annular chamber formed therein for receiving said third bearing.

3. The steering bearing assembly according to claim 2, wherein said race includes an outer peripheral portion having a wall extended upward therefrom for defining said annular chamber.

4. The steering bearing assembly according to claim 3, wherein said race includes an inner peripheral portion having a fence extended upward therefrom for defining said annular chamber between said fence and said wall, said wall includes a height greater than that of said fence.

5. The steering bearing assembly according to claim 1, wherein said second bearing is disposed between said lower portion of said head tube and said race, and said third bearing is disposed between said second bearing and said race.

6. The steering bearing assembly according to claim 5 further comprising two washers disposed between said third bearing and said race and between said third bearing and said second bearing respectively.

7. The steering bearing assembly according to claim 5 further comprising a cup including a peripheral board engaged on said third bearing and including an annular shoulder formed therein for receiving said second bearing.

8. The steering bearing assembly according to claim 7 further comprising a cover engaged on said second bearing and including an inner peripheral portion engaged between said head tube and said cup.

9. The steering bearing assembly according to claim 5, wherein said third bearing is a needle bearing.

10. The steering bearing assembly according to claim 1, wherein said race includes an outer peripheral portion having a wall extended upward therefrom, said wall includes an upper annular shoulder formed therein, a cover is engaged on said second bearing and includes an outer peripheral portion having a protrusion extended into said annular shoulder of said race.

* * * * *